United States Patent [19]

Weaver

[11] Patent Number: 4,507,425

[45] Date of Patent: Mar. 26, 1985

[54] PROCESS FOR PREPARING STABLE POLY(VINYLIDENE HALIDE) LATICES

[75] Inventor: David E. Weaver, Avon Lake, Ohio

[73] Assignee: The B. F. Goodrich Company, Akron, Ohio

[21] Appl. No.: 570,053

[22] Filed: Jan. 12, 1984

[51] Int. Cl.$^3$ .............................................. C08L 27/06
[52] U.S. Cl. .................................. 524/460; 524/551; 524/802
[58] Field of Search ........................ 524/802, 551, 460

[56] References Cited

U.S. PATENT DOCUMENTS

| | | | |
|---|---|---|---|
| 2,862,912 | 12/1958 | Ott | 524/460 |
| 2,979,480 | 4/1961 | Piloni et al. | 524/551 |
| 2,987,493 | 6/1961 | Grady et al. | 524/460 |
| 3,150,112 | 9/1964 | Toy | 524/802 |
| 3,261,796 | 7/1966 | Simons | 524/802 |
| 3,290,265 | 12/1966 | Kaneko | 524/460 |
| 3,321,408 | 5/1967 | Briggs | 524/460 |
| 3,379,665 | 4/1968 | Lyon et al. | 524/460 |
| 3,390,109 | 6/1968 | Reverdin et al. | 524/460 |
| 3,721,636 | 3/1973 | Makower et al. | 524/460 |
| 3,798,194 | 3/1974 | McCann | 524/551 |
| 3,862,077 | 1/1975 | Schulz et al. | 524/460 |
| 4,009,138 | 2/1977 | Kobashi et al. | 524/460 |
| 4,064,087 | 12/1977 | Das | 524/460 |
| 4,092,287 | 5/1978 | Ito et al. | 524/460 |

FOREIGN PATENT DOCUMENTS 0062338 10/1982 European Pat. Off. ............ 524/802

OTHER PUBLICATIONS

Advances in Chemistry Series 125-ACS Washington, D.C. (1973), pp. 99–107.

Primary Examiner—Joseph L. Schofer
Assistant Examiner—N. Sarofim
Attorney, Agent, or Firm—J. Hughes Powell, Jr.; Alan A. Csontos

[57] ABSTRACT

Vinylidene halide monomers are polymerized in water to form homo- and copolymer latices that are stable to mechanical agitation during polymerization and thereafter and to heat below 100° C. are obtained when the vinylidene halide monomers are polymerized, optionally with other copolymerizable vinylidene monomers, in water in the presence of a catalyst or initiator and a neutralized polymer additive of an olefinically unsaturated carboxylic acid monomer containing at least one carboxylic acid group and a terminal methylene group, $H_2C<$ copolymerized with at least one other copolymerizable vinylidene monomer containing a terminal vinylidene group $CH_2<$, said polymer additive having an acid number of greater than 50 to about 450 and a molecular weight of about 2,000 to about 50,000, used in amount of about one to thirty weight parts per one hundred weight parts of vinylidene monomers.

17 Claims, No Drawings

PROCESS FOR PREPARING STABLE POLY(VINYLIDENE HALIDE) LATICES

BACKGROUND OF THE INVENTION

Poly(vinylidene halide) latices, including vinyl chloride polymer latices, are normally prepared by an emulsion polymerization process wherein the vinyl chloride monomer is polymerized with a free radical forming catalyst in water in the presence of water soluble emulsifiers. Emulsifiers used on a commercial basis to make large volumes of polyvinyl chloride latices are normally anionic materials. Typical anionic emulsifiers include alkali metal or ammonium salts of the sulfates of alcohols having from 8 to 18 carbon atoms such as sodium lauryl sulfate; ethanolamine lauryl sulfate and ethylamine lauryl sulfate; alkali metal and ammonium salts of sulfonated petroleum and paraffin oils; sodium salts of sulfonic acids such as dodecane-1-sulfonic acid and octadiene-1-sulfonic acid; aralkyl sulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium-n-octadecyl sulfosuccinamate; alkali metal or ammonium salts of the free acid of complex organic mono- and diphosphate esters; and the like.

While the use of these emulsifiers has resulted in vinylidene latices of varying utility and stability, there are many latex applications where anionic emulsifiers cause problems and are undesirable. Typical problems are lack of stability when compounding materials are added to the latex that effect the emulsifying activity of the emulsifiers and result in instability, and often cause undesirable coagulation. Lack of mechanical stability of latices in spray operations is often a problem. Further, the films and polymers of such latices are often water sensitive, deficient in desirable electrical properties, lack adhesion to certain substrates, foam excessively, and the like. A method for polymerizing vinylidene halide monomers in water in the absence of the usual anionic emulsifiers that would provide stable latices is desired.

SUMMARY OF THE INVENTION

Vinylidene halide monomers are polymerized in water to form homo- and copolymer latices that are stable to mechanical agitation during polymerization and thereafter, and to heat below 100° C., are obtained when the vinylidene halide monomers are polymerized, optionally with other copolymerizable vinylidene monomers, in water in the presence of a catalyst or initiator and a neutralized polymer additive of an olefinically unsaturated carboxylic acid monomer containing at least one carboxylic acid group and a terminal methylene group $H_2C<$ copolymerized with at least one other copolymerizable vinylidene monomer containing a terminal vinylidene group $CH_2<$, said polymer additive having an acid number of greater than 50 to about 450 and a molecular weight of about 2,000 to about 50,000, used in amounts of about one to thirty weight parts per one hundred weight parts of vinylidene monomers.

DETAILED DESCRIPTION

The olefinically unsaturated carboxylic acid monomers contain at least one carbon-carbon double bond susceptible to polymerization and at least one carboxyl group with a terminal methylene grouping ($H_2C<$). Typical olefinically unsaturated carboxylic acid monomers useful in the present invention include acrylic acid, methacrylic acid, ethacrylic acid, α-chloroacrylic acid, α-cyanoacrylic acid, crotonic acid, β-acryloxy propionic acid, and the like. Excellent results are obtained with α,β-olefinically unsaturated monocarboxylic acid monomers containing 3 to 6 carbon atoms. Mixtures of two or more of the carboxylic acid monomers may be employed to prepare the polymer latices. One may also employ acid anhydrides.

It is generally preferred that the copolymers contain at least one lower alkyl acrylate of the formula

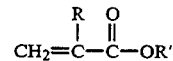

wherein R is hydrogen or an alkyl group containing 1 to 4 carbon atoms and R' is alkyl group containing 1 to 18 carbon atoms including methyl acrylate, ethyl acrylate, butyl acrylate, propyl acrylate, amyl acrylate, isoamyl acrylate, 2-ethyl hexyl acrylate, methyl methacrylate, ethyl methacrylate, butyl methacrylate, propyl methacrylate, amyl methacrylate, 2-ethylhexyl methacrylate, ethyl ethacrylate, and the like.

Optional comonomers that can be used with the carboxylic and acrylate ester monomers include any other copolymerizable vinylidene comonomers containing at least one terminal $CH_2C<$ group. Such polymerizable comonomers include: conjugated dienes such as butadiene, and isoprene, α-olefins such as ethylene, propylene, isobutylene, butene-1, 4-methylpentene-1; vinyl esters such as vinyl acetate; vinyl aromatics such as styrene, α-methyl styrene, vinyl toluene and vinyl naphthalene; alkyl vinyl ethers and ketones such as methylvinyl ether, methylvinyl ketone, isobutyl vinyl ether, isobutyl vinyl ketone, n-butyl vinyl ether, n-butyl vinyl ketone, and isobutyl ether; N-alkoxyalkyl amides of α,β-olefinically unsaturated carboxylic acids such as N-methoxymethyl acrylamide, N-methoxyethyl acrylamide, N-butoxymethyl acrylamide, N-butoxymethyl methacrylamide and the like; amides of α,β-olefinically unsaturated carboxylic acids such as acrylamide, methacrylamide, N-methyl acrylamide, N-t-butyl acrylamide, N-methyl methacrylamide, N-ethyl methacrylamide, diacetone acrylamide and the like; N-methylol acrylamide; vinyl nitriles including acrylonitrile, methacrylonitrile; bis(β-haloalkyl)alkenyl phosphonates such as bis(β-chloroethyl)vinyl phosphonate; and esters of maleic and fumaric acid. A preferred group of copolymers are those of ethyl acrylate and acrylic acid, n-butyl acrylate and acrylic acid, ethyl acrylate, methyl methacrylate and acrylic acid, methyl methacrylate and methacrylic acid, the amount of acid in the copolymer being from about 8 to 32 weight parts. The amount of optimal comonomer in addition to the necessary carboxylic acid and acrylate ester is normally less than about 20 weight percent, usually less than 10 weight percent.

While it is not essential to the practice of the invention, better results are generally observed when the copolymer additive has a softening temperature (Tg) of less than about 40° C.

The comonomers used to form the copolymers should be of a nature so that the resulting copolymers are substantially film-forming at room temperature. As a guide to the physical properties of such polymers, better results have generally been obtained with those copolymers which have a Tg less than about 50° C. and more preferably in the range of about −80° C. to 35° C.

These comonomers preferably have a homopolymer glass temperatures Tg °C. of less than −15° C. so that the copolymer has a Tg °C of less than 35° C.

The temperature at which a polymer changes from a rubbery solid to a brittle substance (the "glass" state), i.e., when it will not tolerate appreciable deformation without fracture, is usually referred to as the "second-order transition temperature" or "glass temperature," and generally is designated by the symbol Tg. Details on measuring the second-order transition temperature of polymers and the ramifications of this value are given in the books "Principles of Polymer Chemistry," Paul J. Flory, Cornell University Press, Ithaca, N.W., 1953, pp. 52–53 and 56–57, and in "Monomeric Acrylic Esters," E. H. Riddle, Reinhold Publishing Corp., New York, N.Y., 1954, pp. 59–60. The glass temperatures of some typical acrylate and methacrylate ester homopolymers are poly(lauryl methacrylate) −65° C.; poly(2-ethylhexyl acrylate) −55° C.; poly(butyl acrylate) −52° C.; poly(ethyl acrylate) −22° C.; poly(octyl methacrylate −20° C.; poly(hexyl methacrylate −5° C.; poly($\beta$-cyano ethyl acrylate 6° C.; poly(methyl acrylate) 2°–9° C.; poly(butyl methacrylate) 20° C.; poly(vinyl acetate) 29° C.; poly(propyl methacrylate) 35° C.; poly(cyclohexyl methacrylate 58° C.; and poly(ethyl methacrylate) 65° C.

The acid number of the carboxyl containing polymer additives used to make the improved vinylidene halide polymer latices of this invention may be varied from greater than 50, as 60, to about 450. A more preferred range is from about 100 to about 300. Excellent results have been obtained with polymers having acid numbers in the range of about 120 to 275. A general correlation of acid number to acid content of the polymer is shown by a series of copolymers of ethyl acrylate and acrylic acid. With 8 weight parts of acrylic acid, the acid number is about 62; with 12 weight parts, about 93; with 16 weight parts, 124; with 24 weight parts, 186; with 32 weight parts, 248. These numbers of course will depend in part on the amount of acrylic acid copolymerized, the molecular weight of other comonomers, and the like, as will be obvious to the man skilled in the art.

The molecular weight of the carboxyl containing polymer additives may also vary over a range of about 2,000 to about 30,000 or 50,000 or more. However, a more useful and practical range is from about 3,000 to about 10,000, for ease of preparation, efficiency, and the like.

There is some relation between the use of polymer additives, acid number and molecular weight. For example, if the molecular weight is high, as about 30,000, polymers with acid numbers in the lower range of the scale given above, i.e., 60, may be used satisfactorily. Similarly, if the acid number of the copolymer additive is high, as 248, copolymers having molecular weights in the lower range as about 2,000 to 3,000 may be used. In general, a better balance is obtained when the acid numbers and molecular weights are within the preferred ranges given above. For example, a copolymer of ethyl acrylate and acrylic acid having an acid number of 247 and a molecular weight of 7120 had not gelled in a 60° C. oven test after 493 days, at which time the test was terminated. However, as is obvious there can be some variation outside these preferred ranges available to the man skilled in the art.

The amount of carboxyl containing polymer additive used in the vinyl halide polymerization also may be varied over a useful range. Normally, the amount of copolymer used will be from greater than about 1 to about 30 weight parts per 100 weight parts of monomer being polymerized; and a more useful range is from about greater than 2 to about 20 weight parts. A preferred range is from about 3 to 10 weight parts on an efficiency basis. Further, it is often desired to keep the amount of copolymer additive at as low a level as possible in the resulting latices, and in this case, lower amounts of copolymer additives having the preferred ranges of acid number and molecular weight are more satisfactory. Normally the higher the acid number, within the preferred range, the less copolymer that will be required at the same molecular weight. It should be recognized, however, that some copolymer additives at the lower ranges of acid numbers and molecular weights may be used in larger amounts if there is reason for using these materials. The minimum amount of additives used is that amount that provides a stable latex during and after preparation. That is, an amount that prevents coagulum formation in the reactor during polymerization; and provides good shear stability and heat aging stability. The carboxyl containing polymer additives must have substantially all of the carboxyl groups neutralized before use in the polymerization. While this may be done with alkali, alkaline earth, or amine materials, preferably it is done with ammonia or ammonium hydroxide.

The vinylidene halide monomer, or mixtures thereof, may be polymerized alone or copolymerized with other olefinically unsaturated or vinylidene comonomers. The vinyl or vinylidene halide monomers correspond to the structural formula

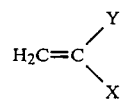

wherein X is a halogen selected from the group consisting of chlorine, bromine or fluorine and Y is hydrogen or a halogen. An especially useful vinyl halide monomer of the above type is vinyl chloride. The amount of vinyl chloride monomer will range from about 40% or more, preferably about 55% or 60%, to 100% by weight of the total monomer composition.

In addition to the vinyl or vinylidene halide, one or more other polymerizable olefinically unsaturated, vinylidene comonomers preferably containing at least one terminal methylene group H$_2$C< may also be employed therewith. Usually less than 50% by weight of these polymerizable comonomers is present. Copolymerizable comonomers include dienes of 4 to 10 carbon atoms, such as butadiene-1,3 or isoprene; cyclic diolefins such as ethylidene norbornene and dicyclopentadiene; α-olefins such as ethylene, propylene, isobutylene, butene-1 and 4-methylpentene-1, preferably containing 1 to 8 carbon atoms; vinyl esters such as vinyl acetate, vinyl laurate and vinyl chloroacetate; vinyl aromatics such as styrene, chlorostyrene, α-methyl styrene, vinyl toluene and vinyl naphthalene; alkyl vinyl ethers and ketones such as methyl vinyl ether, isobutyl vinyl ether, n-butyl vinyl ether, chloroethyl vinyl ether, isobutyl vinyl ketone, methyl vinyl ketone and isobutyl vinyl ether; α,β-olefinically unsaturated nitriles such as acrylonitrile, methacrylonitrile; cyanoalkyl acrylates such as α-cyanomethyl acrylate and the α,β- and γ-cyanopropyl acrylates; olefinically unsaturated carboxylic acids such as acrylic acid, methacrylic acid and the like; polyfunctional monomers such as methylene bisacrylamide; ethylene glycol dimethacrylate, diethylene glycol diacrylate, divinyl benzene and allyl pentaerythritol; bis(β-haloalkyl)alkenyl phosphonates such as bis(β-chloroethyl)vinyl phosphonate; α,β-olefinically unsaturated N-alkylol amides or α,β-olefinically unsaturated N-alkoxy alkyl amides of the formula

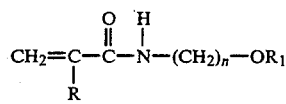

wherein R is hydrogen or an alkyl group containing from 1 to 4 carbon atoms, $R_1$ is hydrogen or an alkyl group containing from 1 to 8 carbon atoms and n is an integer from 1 to 4, including N-methylol acrylamide, N-methylol methacrylamide; amide monomers derived from an α,β-olefinically unsaturated carboxylic acid and having the structural formula

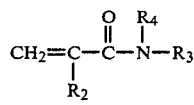

wherein $R_2$ is hydrogen or an alkyl group containing from 1 to 4 carbon atoms and $R_3$ and $R_4$ are hydrogen or a radical containing from 1 to 12 carbon atoms and more preferably an alkyl group containing from 1 to 8 carbon atoms including acrylamide and methacrylamide, N-propyl acrylamides, diacetone acrylamide and the like. Particularly preferred as comonomers are esters of olefinically unsaturated carboxylic acids including α,β-olefinically unsaturated acids such as methyl acrylate, ethyl acrylate, butyl acrylate, isobutyl acrylate, wherein the alkyl groups contain 1 to 8 carbon atoms; chloroproyl acrylate, methyl methacrylate, ethyl methacrylate, methyl ethacrylate, 2-ethylhexyl acrylate, butyl methacrylate, cyclohexyl acrylate, glycidyl acrylate, glycidyl methacrylate, ethoxyacrylate and the like; esters of maleic and fumaric acid, amides of the α,β-olefinically unsaturated carboxylic acids, and the like.

The polymerizations are conducted at temperatures from about 0° C. to about 100° C., usually from about 20° to 60° C., at a pH of about 7 to about 12, in the presence of a compound capable of initiating the polymerizations. Commonly used free radical initiators include the various peroxygen compounds such as persulfates; organic peroxides and hydroperoxides such as benzoyl peroxide, t-butyl hydroperoxide, cumene hydroperoxide, t-butyl diperphthalate, pelargonyl peroxide and 1-hydrocyclohexyl hydroperoxide; azo compounds such as azodiisobutyronitrile and dimethylazodiisobutyrate; and the like. Particularly useful initiators are the watersoluble peroxygen compounds such as hydrogen peroxide, and the sodium, potassium and ammonium persulfates, used by themselves or in an activated redox system. Typical redox systems include alkali metal persulfates in combination with a reducing substance. A large number of redressing agents have been used. Typical are polyhydroxyphenols and oxidizable sulfur compounds such as sodium sulfite or sodium bisulfite, reducing sugars, dimethylamino propionitrile, a diazomercapto compound, water-soluble ferricyanide compounds and the like. Heavy metal ions may also be used to activate the persulfate catalyzed polymerization. The amount of initiator used will generally be in the range between about 0.01% to 5% by weight, based on the total monomers and preferably is between about 0.1% and 2% by weight. The initator may be charged completely at the outset of the polymerization, however, incremental addition or proportioning of the initiator throughout the polymerization may also be employed and is often advantageous.

While the pH of the polymerization system is not critical it is preferred that a pH of 7 or above be maintained during the polymerization. The polymer latex may subsequently be adjusted to a pH greater than 8.

The polymerization reaction may be conducted as batch, intermittent or continuous operations. While all of the polymerization ingredients may be charged initially to the polymerization vessel, better results normally are obtained with proportioning techniques.

Typical polymerizations for the preparation of the latices are conducted by charging the reactor with the appropriate amount of water, the additive and initiator. The reactor is then evacuated, heated to the initiation temperature and charged with the monomer. Optionally, only water, initiator and part of the additive and monomer are charged. After this has been allowed to react for a period of time, proportioning of the remaining monomer and additives is begun, the rate of proportioning being varied depending on the polymerization temperature, the particular initiator employed and the amount of vinylidene halide monomer being polymerized. After all the monomer has been charged, a final addition of initiator may be made and the reactor and the latex heated with agitation for a length of time necessary to achieve complete conversion. The reactor is then vented, cooled and the latex filtered to remove any coagulum formed during the reaction. At the start of the reaction, it is generally desirable to proportionally add a part of the copolymer additive during the course of the reaction. This helps to facilitate control of the polymerization. All of the additive can be proportionally added to the reaction medium during the course of the polymerization reaction. Generally, from about 0% by weight to about 50% by weight of the polymer additive is added initially and from about 50% to about 100% by weight, based on the weight of the monomer(s), is proportionally added during the course of the reaction. The monomer is also proportioned during the course of the polymerization. All of the catalyst may be added initially, or only part, and the remainder proportioned, all at a rate to control the temperature of polymerization.

A useful technique to provide a more uniform and stable latex is to employ a small portion of a previously prepared vinyl polymer or resin latex as a "seed." In general, the weight of the polymer present in the latex used as seed will vary between about 1.0% and about 5.0 to 10.0% by weight of the polymer present in the finished latex. It should be noted that the polymer used as seed need not be identical in composition with the polymer present in the finished latex, but it should be selected from the same class of polymers, i.e., vinylidene halide polymers. The size of the polymer particles in the seed latex may vary over a wide range. Latices in which the average diameter of the polymer particles is in the range of about 400 to about 1500 Angstroms may be employed satisfactorily.

A typical embodiment of the invention, demonstrating preparation of a poly(vinyl chloride) latex using the acid containing additives in accordance with this invention, is described in Example I below. All of the subsequent latex samples described were made following the procedure set forth in this Example.

In the Data Tables a number of test results are reported. The acid numbers of the carboxyl copolymer additives were obtained by dissolving the copolymer in ethanol and titrating the free carboxyl groups potentiometrically with 0.1N aqueous sodium hydroxide. The molecular weights were determined by Gel Permeation Chromotography and are weight average molecular weights. The viscosity of the vinyl halide polymer latices was determined with a Brookfield Viscometer, model LVF, with a #1 spindle at 60 rpm. The mechanical stabilities to high shear mixing was determined by placing 250 grams of latex at 50° C. in a high speed, high shear, blender (Hamilton-Beach) to 18,00 rpm for 15 minutes. The coagulum was measured as percent dry weight, based on the latex total solids, collected on a 120 mesh screen. The Gel Time was measured by filling a measured capped container, 4 ounces, that was placed in a static air oven at 60° C. and examined regularly. The gel point was the point at which the latex was no longer fluid. The inherent viscosity of the vinyl halide polymers was measured in accordance with ASTM Procedure D 1243-66.

EXAMPLE I

The basic recipe used was 100.0 weight parts of vinyl chloride, varying amounts of the carboxyl containing polymer (in this Example I, 8.83 weight parts a copolymer of 68 weight percent ethyl acrylate and 32 weight percent acrylic acid) in the form of the ammonium salt, in water at a concentration of 25 weight percent polymer, molecular weight 7,000. 0.05 weight part of ammonium hydroxide, a 28 weight percent solution, 2.0 weight parts of polyvinyl chloride latex seed in water at a 48 weight percent total solids, said polymer having an average particle size of about 930 Angstroms, 0.2 weight parts of ammonium persulfate and 110.9 weight parts of water.

The polymerizations were conducted in an autoclave equipped with heating, cooling, stirring, sealing and flushing means. The agitation was provided by a marine propellor. 65.98 weight parts of water, 39.4 pounds of demineralized water, 51.4 grams of 282 ammonium hydroxide, 2.46 pounds of polyvinyl chloride seed latex and 57.6 grams of ammonium persulfate were charged to the reactor, which was sealed, flushed twice with nitrogen and heated to 54.4° C. with agitation of 175 rpm.

The vinyl chloride, 63.5 pounds, and the copolymer of ethyl acrylate and acrylic acid, 22.4 pounds of 25% solution in water mixed with 11.8 pounds of demineralized water, were metered separately into the reactor at a constant rate over a 14 hour period; 4.54 pounds per hour for the vinyl chloride and 2.44 pounds per hour for the copolymer water solution. At the end of this period, the temperature of the reactor was raised to 77° C. and held at this temperature for two hours to complete the reaction. The latex was cooled to room temperature, vented, and removed from the reactor. The total solids of the latex was 48.66 weight percent, the yield 95.6 weight percent, and the pH 9.29. The latex was stripped by vacuum evaporation and the pH and total solids adjusted to 9.2 and about 51.0 percent. This polyvinyl chloride polymer had an inherent viscosity of 0.66 (0.4 gram/100 ml cyclohexane). The Brookfield viscosity of the latex was 22 cP (Pa-sec); the surface tension was 52.3 d/cm; mechanical stability, percent coagulum 0.015; and Gel time at 60° C., stable after 10 months in the oven.

EXAMPLES II-IV

To demonstrate the preparation of copolymers of vinyl chloride, three copolymerizations were run using (II) 71 weight parts of vinyl chloride, 14.5 weight parts of n-butyl acrylate and 14.5 weight parts of methyl methacrylate; (III) 82 weight parts of vinyl chloride, 18 weight parts of vinylidene chloride and 1.5 weight parts of N,N'-dimethylol acrylamide; and (IV) 82 weight parts of vinyl chloride and 18 weight parts of ethyl acrylate. 7 weight parts per 100 weight parts of monomers of a copolymer of 68 weight percent n-butyl acrylate and 32 weight percent acrylic acid, molecular weight 3,700, was used in each polymerization. The test results obtained are set forth in Table I.

TABLE I

| EXAMPLE | II | III | IV |
|---|---|---|---|
| Copolymer Tg, °C. | 55 | 65 | 60 |
| Inherent Viscosity | 0.57 | 0.33 | 0.59 |
| Reactor-polymer buildup | None | None | None |
| Latex coagulum, wt. % | 0.05 | 0.02 | 0.76 |
| Conversion % | 98+ | 98+ | 99+ |
| pH | 7.7 | 7.4 | 7.5 |
| Wt. % Total solids | 52.0 | 52.0 | 52.0 |
| Viscosity cP (PaSec.) | 16.5 | 11.2 | 15.5 |
| Surface Tension d/cm | 40.2 | 40.4 | 38.2 |
| Mechanical Stability (% coagulum) | 0.04 | 0.01 | <0.01 |
| Gel Time, days, 60° C. | 27 | 24 | 73 |

EXAMPLES V-X

A series of poly(vinyl chloride) polymer lattices was prepared with carboxyl containing additives prepared from ethyl or n-butyl acrylate and acrylic or methacrylic acid of about the same range of acid number and molecular weight. The amounts of monomers in the additive copolymers, molecular weights and amounts used in parts per hundred of vinyl chloride monomer (pphm) are set forth in Table II. Table II also contains the test data obtained on the samples of these eleven latices. The excellent stability to mechanical agitation and heat stability to gelling are clearly demonstrated.

For comparison purposes, two different poly(acrylic acid) polymers were tested in the same recipe. They had an acid number of 750 (theoretical) and molecular weights of 2,100 and 5,100. 6 weight parts of the polyacrylic acids were used in separate polymerizations. In both the polymer completely coagulated from the reaction mixture, 100 weight percent coagulum, and thus were completely unsatisfactory.

TABLE II

| EXAMPLE | V | VI | VII |
|---|---|---|---|
| Additive Composition | | | |

TABLE II-continued

| | | | | | | |
|---|---|---|---|---|---|---|
| Ethyl acrylate | 75 | | | | 70 | |
| N—butyl acrylate | | | 75 | | | |
| Acrylic Acid | 25 | | 25 | | | |
| Methacrylic Acid | | | | | 30 | |
| Acid Number | 180 | | 183 | | 204 | |
| Molecular Weight | 3780 | | 4580 | | 4950 | |
| Additive pphm | 3.0 | 6.0 | 3.0 | 6.0 | 3.0 | 6.0 |
| Latex coagulum, % | 2.92 | 0.075 | 2.14 | 0.123 | 0.24 | 1.35 |
| Conversion % | 95.7 | 100 | 96.3 | 97.2 | 95.1 | 98.5 |
| pH | 9.1 | 9.1 | 9.1 | 9.1 | 9.1 | 9.1 |
| % Total solids | 50.0 | 50.0 | 50.0 | 50.0 | 50.0 | 50.0 |
| LATEX TESTING | | | | | | |
| Viscosity cP (Pa-Sec) | 10.4 | 12.7 | 9.3 | 11.9 | 9.3 | 15.1 |
| Surface tension, d/cm | 57.7 | 52.2 | 66.0 | 53.0 | 60.6 | 46.3 |
| Mechanical stability | | | | | | |
| % Coagulum | 0.026 | 0.160 | 0.024 | 0.011 | 0.015 | 0.010 |
| Particle Size, | | | | | | |
| Å-before | 2480 | 2562 | 2345 | 1963 | 2290 | 2027 |
| after | 2371 | 2525 | 2510 | 2225 | 2375 | 2098 |
| Gel time, 60° C., days | >210 | >301 | 70 | 105 | >155 | 132 |
| Polymer Inherent Viscosity | 0.73 | 0.59 | 0.66 | 0.60 | 0.79 | 0.67 |

| EXAMPLE | VIII | IX | | X | |
|---|---|---|---|---|---|
| Additive Composition | | | | | |
| Ethyl acrylate | | 68 | | 36 | |
| N—butyl acrylate | 70 | | | | |
| Acrylic Acid | | 32 | | 64 | |
| Methacrylic Acid | 30 | | | | |
| Acid Number | 200 | 233 | | 423 | |
| Molecular Weight | 4390 | 2090 | | 3520 | |
| Additive pphm | 6.0 | 3.0 | 6.0 | 3.0 | 6.0 |
| Latex coagulum, % | 0.139 | 1.48 | 0.13 | 0.65 | 0.64 |
| Conversion % | 97.0 | 91.2 | 94.9 | 88.0 | 94.2 |
| pH | 9.1 | 9.1 | 9.1 | 9.1 | 9.1 |
| % Total solids | 50.0 | 50.0 | 50.0 | 50.0 | 50.0 |
| LATEX TESTING | | | | | |
| Viscosity cP (Pa-Sec) | 13.7 | 11.0 | 10.8 | 13.7 | 14.2 |
| Surface tension, d/cm | 53.7 | 61.7 | 55.3 | 72.4 | 68.6 |
| Mechanical stability | | | | | |
| % Coagulum | 0.021 | 0.010 | 0.006 | 0.050 | 0.031 |
| Particle Size, | | | | | |
| Å-before | 2537 | | | | |
| after | 2457 | | | | |
| Gel time, 60° C., days | >301 | | | | |
| Polymer Inherent Viscosity | 0.69 | | | | |

EXAMPLES XI–XVII

Another series of poly(vinyl chloride) latices were prepared as described in Example I with a variety of carboxyl containing polymer additives containing additional vinylidene comonomers and at varying acid numbers and molecular weights to further demonstrate the range and utility of this invention. The monomers and weight parts used, the acid numbers, molecular weights, amounts used, the results and latex physical properties are listed in Table III.

As an example of a copolymer additive that does not form a soft flexible film at room temperature, a copolymer of 70% methyl methacrylate and 30% of methacrylic acid having an acid number of 224 and a molecular weight of 13,900 provided a polyvinyl chloride latex having satisfactory stability.

TABLE III

| EXAMPLE | XI | | XII | | XIII | | XIV | |
|---|---|---|---|---|---|---|---|---|
| Additive Composition | | | | | | | | |
| Ethyl acrylate | 57 | | 57 | | | | 84 | |
| N—butyl acrylate | 35 | | 35 | | 68 | | | |
| Acrylic Acid | 8 | | 8 | | 32 | | 16 | |
| Acid Number | 65 | | 63 | | 224 | | 124 | |
| Molecular Weight | 30,000 | | 9120 | | 3700 | | 6910 | |
| Additive pphm | 15.0 | 18.46 | 5.26 | 6.47 | 6.97 | 8.58 | 4.32 | 5.32 |
| Latex coagulum, % | 0.15 | 0.54 | 7.86 | 0.45 | 0.002 | 0.35 | 6.43 | 0.38 |
| Conversion % | 88.7 | 96.3 | 82.6 | 95.6 | 98.8 | 98.3 | 87.2 | 100 |
| pH | 9.0 | 9.0 | 9.0 | 9.0 | 9.0 | 9.0 | 9.0 | 9.0 |
| % Total solids | 51.0 | 50.0 | 51.0 | 50.0 | 51.0 | 50.0 | 51.0 | 50.9 |
| LATEX TESTING | | | | | | | | |
| Viscosity cP (Pa-Sec) | 60.0 | 83.0 | 11.7 | 10.7 | 13.4 | 16.5 | 12.4 | 29.4 |
| Surface tension, d/cm | 48.6 | 46.6 | 52.6 | 54.6 | 44.3 | 41.3 | 52.2 | 47.0 |
| Mechanical stability | | | | | | | | |
| % Coagulum | 0.084 | 0.007 | 0.084 | 0.015 | 0.028 | 0.007 | 0.009 | 0.018 |
| Particle Size, | | | | | | | | |
| Å-before | 1495 | 1437 | 2255 | 1950 | 2133 | 1792 | 2352 | 2080 |

TABLE III-continued

| | XV | | XVI | | XVII | |
|---|---|---|---|---|---|---|
| after | 1585 | 1335 | 2823 | 2408 | 2140 | 1787 | 2575 | 1912 |
| Gel time, 60° C., days | 11 | 62 | 7 | 47 | 210 | 263 | 85 | 161 |
| Polymer Inherent Viscosity | 0.51 | 0.52 | 0.69 | 0.63 | 0.71 | 0.50 | 0.67 | 0.54 |

| EXAMPLE | XV | | XVI | | XVII | |
|---|---|---|---|---|---|---|
| Additive Composition | | | | | | |
| Ethyl acrylate | 68 | | 84 | | | |
| N—butyl acrylate | | | | | 68 | |
| Acrylic Acid | 32 | | 16 | | 32 | |
| Acid Number | 247 | | 120 | | 249 | |
| Molecular Weight | 7120 | | 4740 | | 7490 | |
| Additive pphm | 8.83 | 10.87 | 3.53 | 4.34 | 6.94 | 8.54 |
| Latex coagulum, % | 0.002 | 0.11 | 3.92 | 1.3 | 0.002 | 0.02 |
| Conversion % | 95.6 | 94.2 | 94.1 | 95.7 | 100 | 96.1 |
| pH | 9.0 | 9.0 | 9.0 | 9.0 | 9.0 | 9.0 |
| % Total solids | 51.0 | 50.0 | 51.0 | 50.0 | 51.0 | 50.0 |
| LATEX TESTING | | | | | | |
| Viscosity cP (Pa-Sec) | 22.0 | 21.4 | 10.2 | 9.5 | 19.9 | 16.6 |
| Surface tension, d/cm | 52.3 | 54.9 | 56.7 | 58.0 | 48.9 | 51.2 |
| Mechanical stability | | | | | | |
| % Coagulum | 0.015 | 0.009 | 0.042 | 0.017 | 0.038 | 0.008 |
| Particle Size, | | | | | | |
| Å-before | 2513 | 2402 | 2205 | 1956 | 2148 | 1837 |
| after | 2475 | 2292 | 2533 | 2355 | 1977 | 1830 |
| Gel time, 60° C., days | >300 | >493 | 72 | 106 | 73 | 235 |
| Polymer Inherent Viscosity | 0.66 | 0.58 | 0.71 | 0.58 | 0.84 | 0.62 |

In accordance with the novel process of this invention, high conversion of monomers to polymer are achieved with practically no polymer buildup in the latex or on reactor surfaces during polymerization or thereafter, and the resulting latices are substantially free of floc or fine coagulum. The resulting latices are shear and heat stable over long periods of time.

The stable latices prepared in accordance with the novel process of this invention have many uses, particularly in applications where latices of anionic emulsifiers have been unsuccessful or less than desirable results have been obtained. A variety of compounding ingredients, including salts of carboxylic containing polymers in latex form, that normally cause coagulation when added to vinylidene halide polymer latices made with conventional anionic emulsifiers, may be used in the latices prepared as described herein. Further, polymer coating and films of the latices prepared in accordance with the invention have good water resistance. Latices made in this way are easily stripped of unreacted monomers while heating under vacuum without the foaming disadvantage experienced with conventionally stabilized latices.

I claim:

1. A method for preparing stable latices of vinylidene halide polymers comprising polymerizing said vinylidene halide monomers having the formula

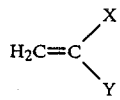

wherein X is a halogen selected from the group consisting of chlorine, bromine or fluorine and Y is hydrogen or a halogen as defined, in water, in the presence of a free radical initiating catalyst and about one to thirty weight parts of a polymer additive, per one hundred weight parts of monomers, of a water soluble salt of a copolymer of an olefinically unsaturated carboxylic acid monomer and at least one copolymerizable comonomer of the formula

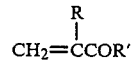

wherein R is hydrogen or an alkyl group containing 1 to 4 carbon atoms and R' is an alkyl group containing 1 to 12 carbon atoms, said copolymer having an acid number of greater than 50 to about 450 and a weight average molecular weight of about 2,000 to about 50,000.

2. A method of claim 1 wherein said vinylidene monomer is vinyl chloride.

3. A method of claim 2 wherein there is used about 2 to 20 weight parts of an ammonium salt of the polymer additive, R is hydrogen or methyl, R' is an alkyl group containing 1 to 8 carbon atoms, said copolymer has an acid number of about 100 to about 300 and the molecular weight is from about 3,000 to about 10,000.

4. A method of claim 3 wherein said carboxylic acid monomer is acrylic acid.

5. A method of claim 4 wherein said carboxylic acid monomer is methacrylic acid.

6. A method of claim 4 wherein from 0 to less than about 45 weight percent of a vinylidene monomer having a terminal $CH_2 <$ group is copolymerized with said vinyl chloride, said polymer additive comprises acrylic acid in amount of about 8 to 32 weight parts and an acrylate ester wherein R' is hydrogen and an alkyl group containing 2 to 4 carbon atoms.

7. A method of claim 6 wherein said additive copolymer contains about 92 to 68 weight percent of n-butyl acrylate.

8. A method of claim 6 wherein said additive copolymer contains about 92 to 68 weight percent of ethyl acrylate and methyl methacrylate.

9. A method of claim 5 wherein said additive copolymer contains about 92 to 68 weight percent of n-butyl acrylate.

10. A method of claim 5 wherein said additive copolymer contains about 92 to 68 weight percent of ethyl acrylate and methyl methacrylate.

11. Stable latices of vinylidene halide polymers prepared by polymerizing vinylidene halide monomers having the formula

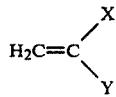

wherein X is a halogen selected from the group consisting of chlorine, bromine or fluorine and Y is hydrogen or a halogen as defined, in water, in the presence of a free radical initiating catalyst and about one to thirty weight parts, per one hundred weight parts of monomers, of a polymer additive of a water soluble salt of an olefinically unsaturated carboxylic acid monomer and at least one copolymerizable comonomer of the formula

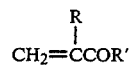

wherein R is hydrogen or an alkyl group containing 1 to 4 carbon atoms and R' is an alkyl group containing 1 to 12 carbon atoms, said copolymer having an acid number of greater than 50 to about 450 and a weight average molecular weight of about 2,000 to about 50,000.

12. Stable latices of claim 11 wherein said vinylidene monomer is vinyl chloride.

13. Stable latices of claim 12 wherein there is used about 2 to 20 weight parts of an ammonium salt of the copolymer additive, R is hydrogen or methyl, R' is an alkyl group containing 1 to 8 carbon atoms, said copolymer has an acid number of about 100 to about 300 and the molecular weight is from about 3,000 to about 10,000.

14. Stable latices of claim 13 wherein said carboxylic acid monomer is acrylic acid.

15. Stable latices of claim 14 wherein said carboxylic acid monomer is methacrylic acid.

16. Stable latices of claim 15 wherein R' is n-bytyl.

17. Stable latices of claim 15 wherein R is methyl and R' is ethyl.

* * * * *